United States Patent
Choi

(10) Patent No.: US 11,753,081 B2
(45) Date of Patent: Sep. 12, 2023

(54) HYBRID COWL CROSS BAR AND METHOD OF MANUFACTURING THE SAME

(71) Applicant: HYUNDAI MOBIS Co., Ltd., Seoul (KR)

(72) Inventor: Ik Keun Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/104,895

(22) Filed: Nov. 25, 2020

(65) Prior Publication Data

US 2021/0163072 A1    Jun. 3, 2021

(30) Foreign Application Priority Data

Nov. 29, 2019    (KR) ........................ 10-2019-0157778

(51) Int. Cl.

| | |
|---|---|
| *B62D 25/14* | (2006.01) |
| *B62D 29/00* | (2006.01) |
| *B29C 45/14* | (2006.01) |
| *B29K 705/00* | (2006.01) |
| *B29L 31/00* | (2006.01) |

(52) U.S. Cl.
CPC ...... *B62D 25/145* (2013.01); *B29C 45/14598* (2013.01); *B62D 29/004* (2013.01); *B29K 2705/00* (2013.01); *B29L 2031/001* (2013.01)

(58) Field of Classification Search
CPC .. B62D 25/145; B62D 29/004; B62D 29/005; B29C 45/14598
USPC .................................................. 296/193.02
See application file for complete search history.

(56) References Cited

U.S. PATENT DOCUMENTS

| | | | |
|---|---|---|---|
| 3,192,297 A | 6/1965 | Gringras | |
| 6,877,787 B2 * | 4/2005 | Ito ........................ | B62D 25/142 |
| | | | 296/70 |

(Continued)

FOREIGN PATENT DOCUMENTS

| | | | | |
|---|---|---|---|---|
| FR | 2876644 A1 * | 4/2006 | ........... | B62D 25/145 |
| FR | 2876655 A1 | 4/2006 | | |

(Continued)

OTHER PUBLICATIONS

Machine Translation of FR2876644A1, printed from the EPO website, Mar. 25, 2022.*

(Continued)

*Primary Examiner* — Jason S Morrow

(57) ABSTRACT

The present invention relates to a hybrid cowl cross bar manufactured through an improved method of performing an insert injection molding without applying hydraulic pressure to the inside of a metal pipe during injection molding in order to simplify a manufacturing process of a hybrid cowl cross bar and to secure rigidity of the cowl cross bar. According to an aspect of the present invention, a reinforcing material is inserted into a metal pipe that is a material of a cowl cross bar. The metal pipe may be made of a material such as aluminum, magnesium, or steel, like a conventional cowl cross bar. The reinforcing material may be manufactured by extruding a synthetic resin or a composite material (for example, PP+GF50%). A rib may be formed inside the reinforcing material to increase a capability to resist injection pressure when the metal pipe is insert-injected and to secure rigidity.

10 Claims, 5 Drawing Sheets

(56) References Cited

U.S. PATENT DOCUMENTS

| | | | | |
|---|---|---|---|---|
| 6,988,764 B2* | 1/2006 | Matsutani | ............ | B62D 25/142 |
| | | | | 296/70 |
| 7,150,489 B2* | 12/2006 | Yoshida | ............... | B62D 25/145 |
| | | | | 296/72 |
| 7,291,785 B2* | 11/2007 | Riester | ................. | B62D 29/004 |
| | | | | 174/72 A |
| 7,303,714 B2* | 12/2007 | Matsuzaki | ............ | B62D 25/145 |
| | | | | 264/328.12 |
| 8,919,855 B2* | 12/2014 | Ruiz Rincon | ........ | B62D 29/001 |
| | | | | 296/70 |
| 9,555,569 B2* | 1/2017 | Birka | ................ | B29C 45/14598 |
| 10,940,894 B2* | 3/2021 | Dormanns | ............. | B33Y 80/00 |
| 11,001,303 B2* | 5/2021 | Kong | ....................... | B62D 1/19 |
| 2004/0050443 A1 | 3/2004 | Trivelli | | |
| 2007/0006986 A1* | 1/2007 | Derleth | ................. | B60H 1/242 |
| | | | | 162/234 |
| 2009/0162688 A1 | 6/2009 | Handing et al. | | |
| 2018/0117808 A1 | 5/2018 | Cho et al. | | |
| 2021/0354761 A1* | 11/2021 | Choi | .................... | B62D 29/001 |
| 2021/0354762 A1* | 11/2021 | Choi | .................... | B62D 25/081 |
| 2021/0354763 A1* | 11/2021 | Choi | .................... | B62D 25/145 |
| 2022/0009556 A1* | 1/2022 | An | ........................ | B60K 37/00 |
| 2022/0009558 A1* | 1/2022 | Choi | ................. | B60H 1/00564 |

FOREIGN PATENT DOCUMENTS

| | | |
|---|---|---|
| KR | 10-1788735 B1 | 10/2017 |
| WO | 2019098427 A1 | 5/2019 |

OTHER PUBLICATIONS

Office Action issued in corresponding Chinese Patent Application No. 20011363799.2 dated May 31, 2022 with English translation.

\* cited by examiner

HYBRID COWL CROSS BAR AND METHOD OF MANUFACTURING THE SAME

CROSS-REFERENCE TO RELATED APPLICATION

This application claims priority to and the benefit of Korean Patent Application No. 10-2019-0157778, filed on Nov. 29, 2019, the disclosure of which is incorporated herein by reference in its entirety.

BACKGROUND

1. Field of the Invention

The present invention relates to a hybrid cowl cross bar, and more particularly, to a hybrid cowl cross bar having a structure with reinforced rigidity, and a method having a simplified process of manufacturing the same.

2. Discussion of Related Art

A cowl cross bar is one component of a vehicle cockpit module and serves to guide and support a variety of components of a cockpit, such as a steering shaft, an instrument panel, an air conditioning system, an airbag, an audio system, etc. In addition, the cowl cross bar is a framework configured to prevent a vehicle from being bent or twisted laterally and increase the durability of a vehicle body. Furthermore, the cowl cross bar provides a guide surface on which the components of the cockpit are mounted and safely protects passengers in a head-on collision.

A cowl cross bar is manufactured using a pipe made of a metal such as aluminum, magnesium, or steel or by injecting a synthetic resin or a composite material. In recent years, a cowl cross bar is made of a hybrid material including a composite material or a hybrid substance in order to reduce costs and weight.

FIG. 1 illustrates an example of a hybrid type cowl cross bar. A manufacturing process of the illustrated hybrid type cowl cross bar is as follows. An aluminum pipe is bent into a desired shape and inserted into a mold. Before a synthetic resin is injected onto the pipe, the inside of the pipe is expanded by applying hydraulic pressure (called as hydroforming process). The applied hydraulic pressure ranges from about 600 to 900 bar. In this case, an insert injection molding is performed on the outer side of the pipe. Here, injection pressure is about 1,300 bar.

In the above-described manufacturing process, a reason for applying the hydraulic pressure to the inside of the aluminum pipe is to prevent a change in dimension and injection leakage due to the deformation of the aluminum pipe caused by the injection pressure during the insert injection molding. FIG. 2 illustrates an example of injection leakage (left). FIG. 2 also illustrates non-uniformity of pressure in respective portions of the pipe.

As described above, conventionally, due to a hydroforming process, the number of processes of manufacturing a cowl cross bar is increased, and it is necessary to construct injection equipment capable of performing hydroforming, thereby giving rise to excessive costs. On the other hand, when hydraulic pressure is not applied, excessive deformation occurs in a pipe.

SUMMARY OF THE INVENTION

The present invention is directed to providing a hybrid cowl cross bar manufactured through an improved method of performing an insert injection molding without applying hydraulic pressure to the inside of a metal pipe during injection molding in order to simplify a manufacturing process of a hybrid cowl cross bar and to secure rigidity of the cowl cross bar, thereby solving above problems.

In order to solve the problems, according to an aspect of the present invention, a hybrid cowl cross bar is provided, in which a reinforcing material is inserted into a metal pipe that is a material of a cowl cross bar. The metal pipe may be made of a material such as aluminum, magnesium, or steel, like a conventional cowl cross bar. The reinforcing material may be manufactured by extruding a synthetic resin or a composite material (for example, PP+GF50%).

A rib may be formed inside the reinforcing material to increase a capacity to resist injection pressure when the metal pipe is insert-injected and to secure rigidity. The rib may be manufactured in various shapes such as a cross shape, a linear shape, a polygonal shape such as a triangular shape or a quadrangular shape, an irregular shape, etc.

According to another aspect of the present invention, a method of manufacturing a hybrid cowl cross bar is provided, the method including: providing a metal pipe, providing a reinforcing material, inserting the reinforcing material into the provided metal pipe to manufacture a semi-finished cowl cross bar, inserting the semi-finished cowl cross bar into a mold, and performing an insert injection molding on an outer side of the metal pipe in the mold.

The reinforcing material may be manufactured through injection molding, extrusion molding, or cutting processing according to an inside shape thereof. In addition, the reinforcing material inserted into the metal pipe may be fixed using an adhesive or other coupling parts.

The above-described configurations and operations of the present invention will become more apparent from embodiments described in detail below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
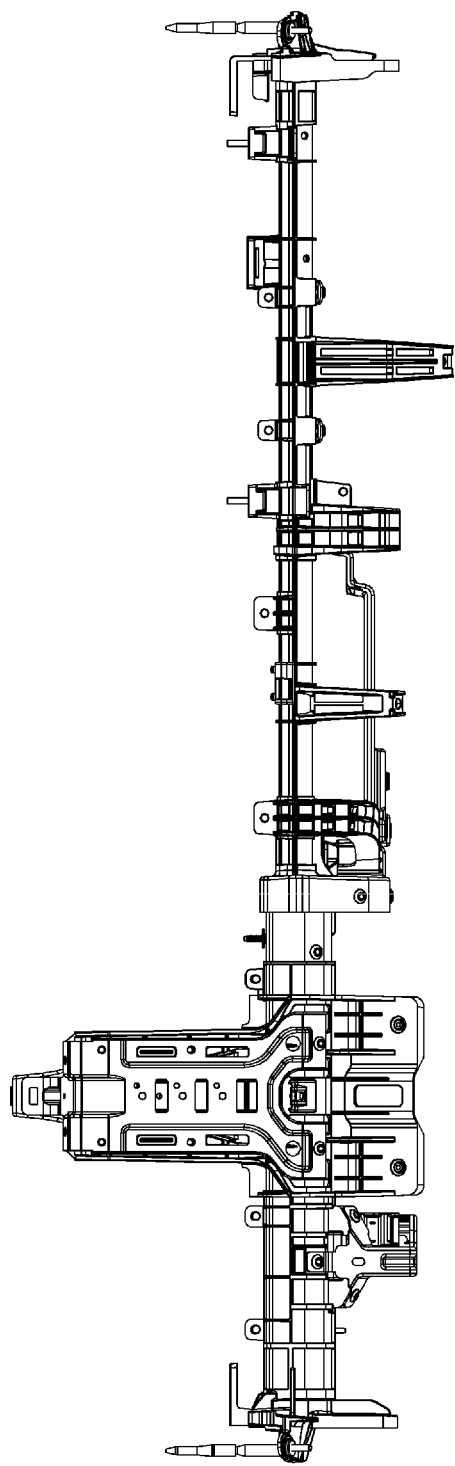
FIG. 1 is an exemplary view of a hybrid type cowl cross bar.
Figure 2:
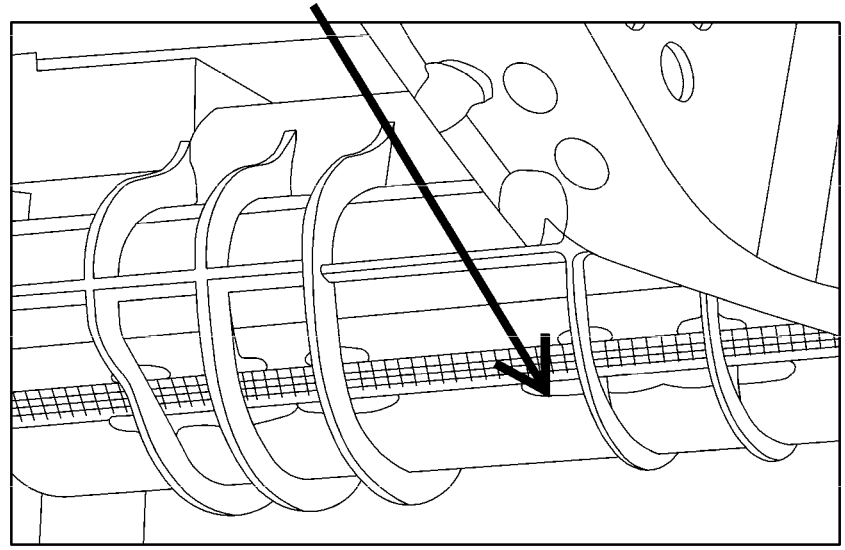
FIG. 2 illustrates views for describing problems of a conventional hybrid type cowl cross bar.
Figure 2:
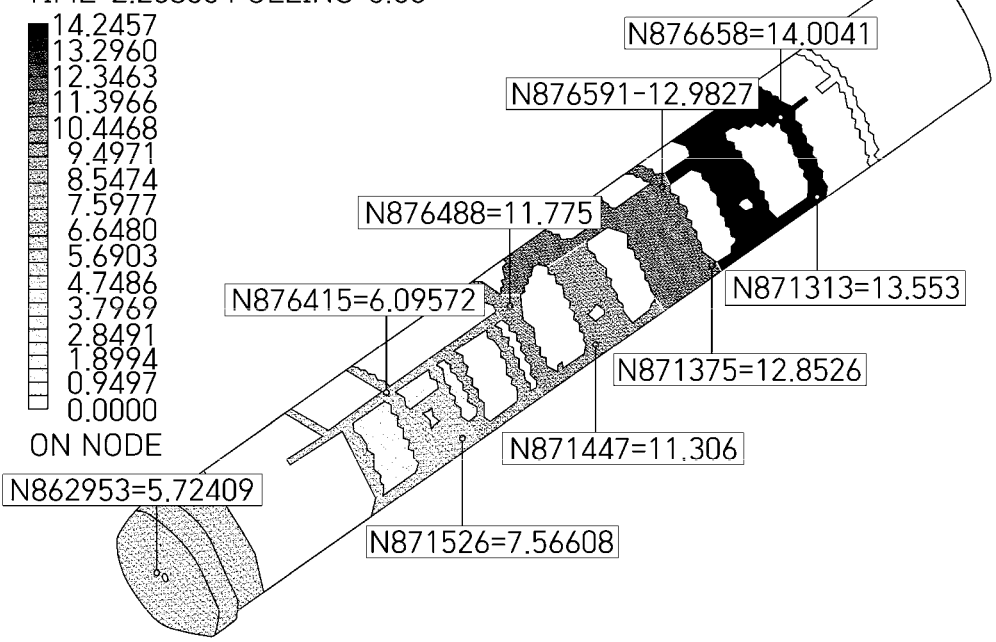

The advantages and features of the present invention and methods for accomplishing the same will be more clearly understood from embodiments to be described in detail below with reference to the accompanying drawings. However, the present invention is not limited to the following embodiments but may be implemented in various different forms. Rather, these embodiments are provided only to complete the disclosure of the present invention and to allow those skilled in the art to understand the category of the present invention. The present invention is defined by the category of the claims. Meanwhile, terms used in this specification are to describe the embodiments and are not intended to limit the present invention. As used herein, singular expressions, unless defined otherwise in context, include plural expressions. It will be further understood that the terms "comprises," "comprising," "includes," and/or "including," if used herein, specify the presence of stated components, steps, operations, and/or elements, but do not preclude the presence or addition of one or more other components, steps, operations, and/or elements.

Hereinafter, exemplary embodiments of the present invention will be described in detail with reference to the accompanying drawings. In adding reference numerals for elements in each drawing, it should be noted that like reference numerals already used to denote like elements in other drawings are used for elements wherever possible. Moreover, in describing the present invention, detailed descriptions related to well-known functions or configurations will be ruled out in order not to unnecessarily obscure subject matters of the present invention.

Figure 3:
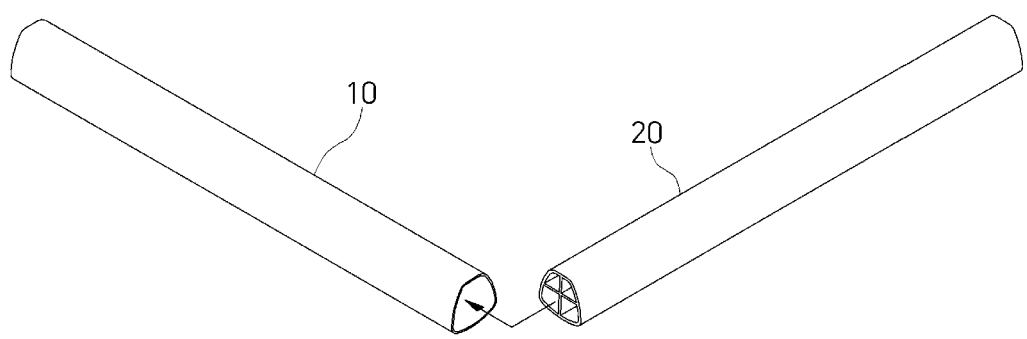
FIG. 3 is an exploded view of a hybrid cowl cross bar according to the present invention.

FIG. 3 is an exploded view of a hybrid cowl cross bar according to the present invention.

A pipe- or rod-shaped reinforcing material 20 is inserted into a metal pipe 10. The metal pipe 10 is made of a material such as aluminum, magnesium, or steel. The reinforcing material 20 is manufactured by extruding a synthetic resin or a composite material (for example, PP+GF50%).

As described above, when the metal pipe 10 is manufactured in a multi-layered structure in which the reinforcing material 20 is inserted into the metal pipe 10, a thickness or diameter can be reduced as compared with a metal pipe having the same specification as the metal pipe 10, thereby obtaining additional effects of reducing costs, reducing weight, and increasing design flexibility.

Figure 4:
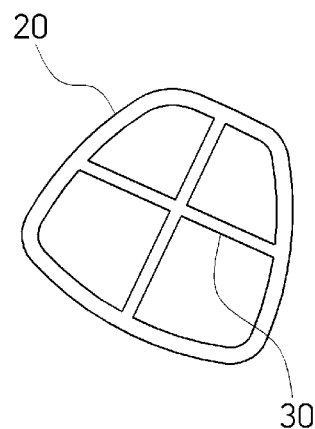
FIG. 4 is a cross-sectional view of a reinforcing material (20)

FIG. 4 is a cross-sectional view of the reinforcing material 20.

By applying a cross-shaped ('+') rib 30 in an extruded pipe, a capability to resist injection pressure can be increased when being insert-injected in the metal pipe 10, and rigidity against vehicle collision and rigidity against sagging can be secured when the cowl cross bar is applied to an actual vehicle after being manufactured.

The rib 30 shown in FIG. 4 is shaped like a cross ('+') but is not limited thereto. In order to achieve the purpose of increasing rigidity of the reinforcing material 20, the rib 30 may be manufactured in various shapes such as a simple linear shape ('-'), a polygonal shape such as a triangular shape or a quadrangular shape, an irregular shape (star or oval shape), or the like.

Figure 5:
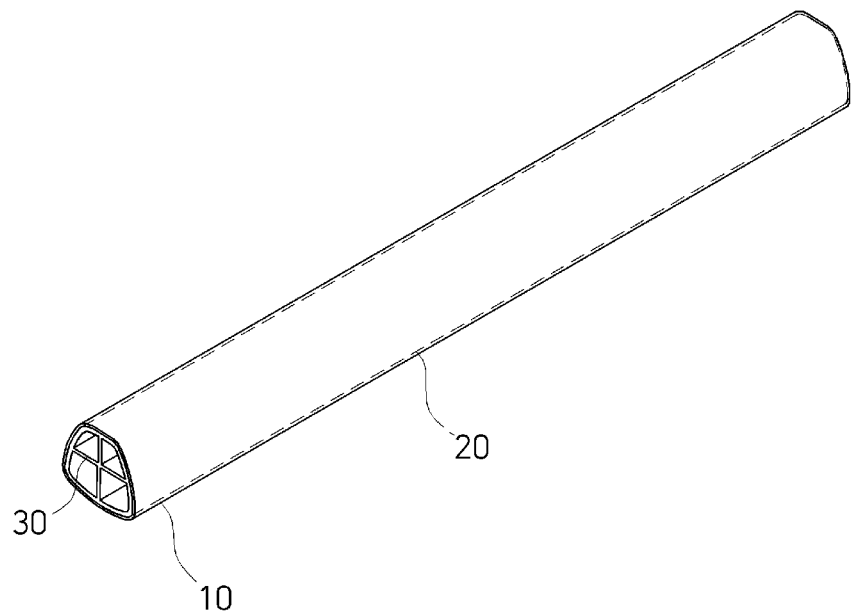
FIG. 5 is a view illustrating an exterior of a semi-finished cowl cross bar in which the reinforcing material (20) is inserted into a metal pipe (10)

FIG. 5 illustrates a semi-finished cowl cross bar in a state in which the reinforcing material 20 is inserted into the metal pipe 10. Here, the term "semi-finished cowl cross bar" refers to a product before an insert injection molding is performed by introducing the semi-finished cowl cross bar into a mold for insert injection molding. After the semi-finished cowl cross bar is introduced into the mold, the insert injection molding is performed on a synthetic resin immediately without performing a hydroforming process applying hydraulic pressure required in a conventional process.

Figure 6:
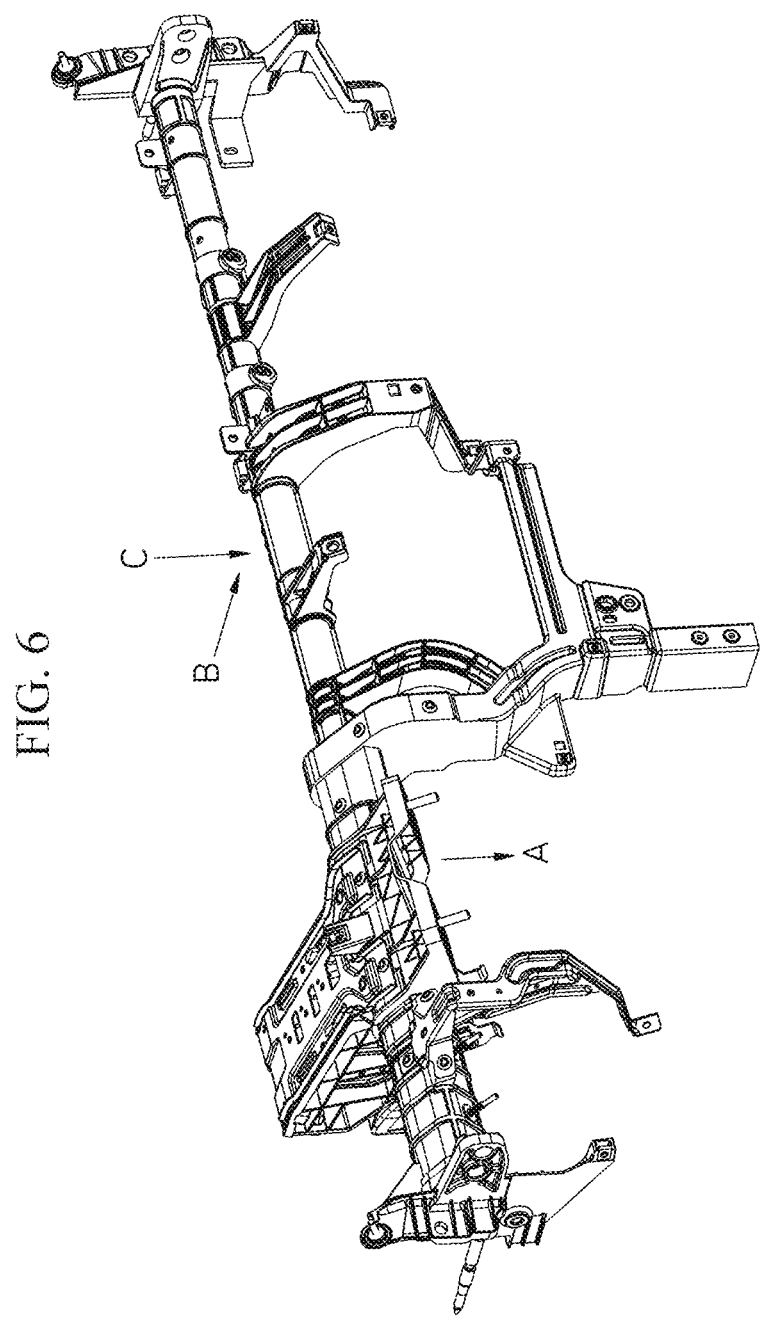
FIG. 6 is an exemplary view of a hybrid cowl cross bar product manufactured and finally assembled according to the present invention.

FIG. 6 is an exemplary view of a hybrid cowl cross bar product manufactured and finally assembled according to the present invention. Various necessary brackets and supports are assembled on an insert-injected cross bar.

According to the present invention, rigidity (A) against noise vibration harshness (NVH), rigidity (B) against a collision, and rigidity (C) against sagging are all improved. However, in order to improve the rigidities, costs are not increased and a process is not complicated, but rather the hydroforming process is eliminated. Thus, costs in terms of a process are reduced, and the process becomes simplified.

Hereinafter, a manufacturing process of insert injection molding for the hybrid cowl cross bar will be comprehensively described.

First, a metal pipe 10 is provided. A material such as aluminum, magnesium, or steel may be used as a metal material.

A reinforcing material 20 is provided. The reinforcing material 20 may be made of a synthetic resin or a composite material (for example, PP+GF50%) having high rigidity. The reinforcing material 20 may be manufactured through injection molding, extrusion molding, or cutting processing according to an inside shape thereof.

The reinforcing material 20 is inserted into the provided metal pipe 10. Cold insertion or hot insertion is possible, and dimensions of the metal pipe 10 and the reinforcing material 20 and a gap therebetween will be determined according to which insertion method is performed. In addition, whether to use an adhesive or coupling parts (for example, screws, or the like) between the metal pipe 10 and the reinforcing material 20 will be determined according to design specifications of those skilled in the art.

A semi-finished cowl cross bar manufactured as described above is inserted into a mold.

An insert injection molding is performed on the outer side of a pipe in the mold. In this case, hydroforming of expanding the inside of the pipe using hydraulic pressure is unnecessary. Therefore, an injection pressure of about 1300 bar, which has been applied conventionally, is reduced to a pressure less than about 1,000 bar or a pressure of several hundred bar which is less than or equal to 1,000 bar.

After that, after a process of holding pressure or the like is performed, the mold is opened (mold opening) to take out a molded product, and necessary components such as a steering column, a bracket, and a support are assembled with the molded product. A final inspection is performed using a gauge such as a Go-No gauge to release a finished hybrid cowl cross bar.

According to the present invention, since a hydroforming process required for a conventional hybrid cowl cross bar is not included, the number of manufacturing processes is reduced, and hydroforming equipment is not necessary, thereby increasing rigidity of a cowl cross bar and improving all of rigidity against NVH, rigidity against a collision, and rigidity against sagging.

The configuration of the present invention has been described in detail with reference to the exemplary embodiments of the present invention, but those skilled in the art will understand that the present invention may be implemented in another specific form different from the content disclosed in this specification without changing the technical spirit or an essential feature of the present invention. Thus, it is to be appreciated that the embodiments described above are intended to be illustrative in every sense and not restrictive. The scope of the present invention is represented by the claims to be described below rather than the detailed description, and it is to be interpreted that the scope of the claims and all the changes or modified forms derived from the equivalents thereof are included in the scope of the present invention.

What is claimed is:

1. A hybrid cowl cross bar comprising:
a metal pipe; and
a reinforcing material inserted into the metal pipe,
wherein the reinforcing material comprises:
an outer portion having a shape of a single closed loop; and
a first inner portion and a second inner portion each protruding from a portion of the outer portion and extending to be connected to another portion of the outer portion, wherein the first and second inner portions intersect with each other.

2. The hybrid cowl cross bar of claim 1, wherein the reinforcing material is made of at least one material selected from a synthetic resin and a composite material.

3. The hybrid cowl cross bar of claim 2, wherein the composite material is PP+GF50%.

4. A hybrid cowl cross bar comprising:
a metal pipe; and
a reinforcing material inserted into the metal pipe and having a shape of a single closed loop,
wherein a rib is provided inside the reinforcing material and protrudes from an inner surface of the reinforcing material to increase a capacity to resist injection pressure when the metal pipe is insert-injected and to secure rigidity, and
wherein the rib is shaped like a cross.

5. The hybrid cowl cross bar of claim 4, wherein the reinforcing material is made of at least one material selected from a synthetic resin and a composite material.

6. The hybrid cowl cross bar of claim 5, wherein the composite material is PP+GF50%.

7. A method of manufacturing a hybrid cowl cross bar, the method comprising:
providing a metal pipe and a reinforcing material to be inserted into the metal pipe;
inserting the reinforcing material into the provided metal pipe to manufacture a semi-finished cowl cross bar;
inserting the semi-finished cowl cross bar into a mold; and
performing an insert injection molding on an outer side of the metal pipe in the mold.

8. The method of claim 7, wherein, in the providing of the reinforcing material, the reinforcing material is manufactured through one method among an injection molding method, an extrusion molding method, and a cutting processing method.

9. The method of claim 7, wherein the inserting of the reinforcing material into the provided metal pipe includes fixing the reinforcing material inserted in the metal pipe using a coupling part.

10. The hybrid cowl cross bar of claim 1, wherein the first and second inner portions are shaped like a cross.

* * * * *